(12) United States Patent
Nayyar et al.

(10) Patent No.: US 11,502,911 B2
(45) Date of Patent: Nov. 15, 2022

(54) DYNAMIC AUGMENTATION FOR FUNCTIONALLY SIMILAR DATA MODELS ON NETWORK DEVICES

(71) Applicant: Cisco Technology, Inc., San Jose, CA (US)

(72) Inventors: Munish Nayyar, Fremont, CA (US); Benoit Claise, Othée (BE); Adithya Reddy Sesani, Fremont, CA (US); Santiago Alvarez, Mountain View, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/224,769

(22) Filed: Apr. 7, 2021

(65) Prior Publication Data
US 2022/0329489 A1    Oct. 13, 2022

(51) Int. Cl.
*H04L 12/00* (2006.01)
*H04L 41/0893* (2022.01)
*G06F 16/904* (2019.01)
*H04L 41/12* (2022.01)

(52) U.S. Cl.
CPC ........ *H04L 41/0893* (2013.01); *G06F 16/904* (2019.01); *H04L 41/12* (2013.01)

(58) Field of Classification Search
CPC .... H04L 41/0893; H04L 41/12; G06F 16/904
USPC ............................................... 709/223, 220
See application file for complete search history.

(56) References Cited

U.S. PATENT DOCUMENTS

| | | | |
|---|---|---|---|
| 9,652,790 B2* | 5/2017 | Anand | G06Q 30/0601 |
| 10,318,889 B2* | 6/2019 | Xu | G06T 11/60 |
| 2006/0235882 A1* | 10/2006 | Mateescu | H04L 65/103 |
| 2017/0187577 A1 | 6/2017 | Nevrekar et al. | |
| 2018/0013662 A1 | 1/2018 | Salam et al. | |
| 2018/0205801 A1* | 7/2018 | Kovacs | G06F 16/258 |
| 2018/0247227 A1* | 8/2018 | Holtham | G06N 3/0454 |
| 2019/0132213 A1 | 5/2019 | Na et al. | |

(Continued)

FOREIGN PATENT DOCUMENTS

| | | | | |
|---|---|---|---|---|
| CN | 110134833 A | * | 8/2019 | H04L 12/00 |
| CN | 110852449 A | * | 2/2020 | H04L 12/00 |
| CN | 110855459 A | * | 2/2020 | G06F 40/35 |

(Continued)

*Primary Examiner* — Frantz Coby
(74) *Attorney, Agent, or Firm* — Edell, Shapiro & Finnan, LLC

(57) ABSTRACT

A network device is provisioned with a first data model of a first type and that models first properties for the network device, a second data model of a second type and that models second properties for the network device, and mappings that indicate mapped first properties among the first properties that are mapped to mapped second properties of the second properties. Upon receiving a request from a network for data for the first data model, the network device retrieves first data for the first properties of the first data model. The network device determines, based on the mappings, unmapped second properties of the second properties that are not mapped to any of the first properties. The network device retrieves, as dynamically augmented data, data for the unmapped second properties. The network device sends a request response including the first data and the dynamically augmented data.

20 Claims, 9 Drawing Sheets

(56) References Cited

U.S. PATENT DOCUMENTS

2020/0328948 A1    10/2020  Nayyar et al.
2021/0409521 A1 *  12/2021  Platenius-Mohr ..... G06N 5/022

FOREIGN PATENT DOCUMENTS

| CN | 112383044   A  * | 2/2021  | ............. H04L 12/00    |
| EP |   1715431  A1 * | 10/2006 | ....... H04L 29/06027       |
| EP |   3726810  A1 * | 10/2020 | ......... G05B 19/4183      |
| EP |   3796231  A1 * | 3/2021  | ............ B60W 30/00     |
| WO | WO-2017005817 A1 * | 1/2017 | ....... G06F 17/30569     |
| WO |   2019233616 A1 | 12/2019 |                             |
| WO | WO-2020038337 A1 * | 2/2020 | ............. G06F 40/35  |

* cited by examiner

600

602 {
```
<interfaces xmlns=http://openconfig.net/yang/interfaces>
<interface>
<name>Ether1</name>
<state>
<counters>
<in-pkts>989898</in-pkts>
```

604 {
```
<sde-data xmlns=http://cisco.com/ns/Cisco-IOS-openconfig-self-describing-ext>   606
<nodes xmltagsns:sde-source-path=Cisco-IOS-XR-pfi-cmd-oper:interface-xr/
interface/interface-statistics/full-interface-stats>                            608
<output-queue-drops> 99997 </output-queue-drops>
<input-queue-drops> 99998 </input-queue-drops>                                  610
<runt-packets-received-queue-drops> 99999 </runt-packet-received-queue-drops>
</nodes>
</sde-data>
. . . . . .
</counters>
</state>
</interface>
</interface>
```

FIG.6

| High Models | Low Models | Low Models |
|---|---|---|
| ▼ ○ openconfig-acl<br>  ▼ 📁 acl<br>    ▶ 📁 config<br>    ▶ 📁 state<br>    ▼ ☑ acl-sets<br>      ▼ 📁 acl-set<br>        🔑✓ name<br>        🔑✓ type<br>        ▶ 📁 config<br>        ▶ 📁 state<br>        ▼ 📁 acl-entries<br>          ▼ ☑ acl-entry<br>            ▶ 📁 config<br>            ▶ 📁 state<br>            ▼ ☑ l2<br>              ▼ 📁 config<br>                🔑✓ source-mac<br>                🔑✓ source-mac-mask<br>                🔑✓ destination-mac<br>                🔑✓ destination-mac-mask<br>                🔑✓ ethertype<br>              ▶ 📁 state<br>            ▼ ☑ ipv4<br>            ▼ ☑ ipv6<br>              ▼ 📁 config<br>                🔑✓ source-address<br>                🔑✓ source-flow-label<br>                🔑✓ destination-address<br>                🔑✓ destination-flow-label | ▶ ○ Cisco-IOS-XR-PRIVATE-ocacl-ipv4-oper<br>▼ ○ Cisco-IOS-XR-es-acl-cfg<br>  ▼ 📁 es-acl<br>    ▼ 📁 accesses<br>      ▼ ☑ access<br>        ▼ 📁 access-list-entries<br>          ▼ ☑ access-list-entry<br>            🔑✓ sequence-number<br>            🔑✓ grant<br>            ▶ 📁 source-network<br>            ▶ 📁 destination-network<br>            🔑 vlan1<br>            🔑 vlan2<br>            🔑 cos<br>            🔑 dei<br>            🔑 inner-vlan1<br>            ● inner-vlan2<br>            🔑 inner-cos<br>            🔑 inner-dei<br>            🔑 remark<br>            🔑✓ ether-type-number<br>            🔑✓ capture<br>            🔑✓ log-option<br>            🔑 sequence-str<br>            🔑✓ name<br>▶ ○ Cisco-IOS-XR-ifmgr-cfg<br>▼ ○ Cisco-IOS-XR-ipv4-acl-cfg | ▶ ○ Cisco-IOS-XR-ipv6-acl-cfg<br>  ▼ 📁 ipv6-acl-and-prefix-list<br>    ▼ 📁 accesses<br>      ▼ ☑ access<br>        ▼ 📁 access-list-entry<br>          ⋮<br>          ▶ 📁 source-network<br>          ▶ 📁 destination-network<br>          ▶ 📁 source-port<br>          ▶ 📁 destination-port<br>          ▶ 📁 icmp<br>          ▶ 📁 tcp<br>          ▶ 📁 packet-length<br>          ▶ 📁 time-to-live<br>          ▶ 📁 next-hop<br>          🔑 counter-name<br>          🔑✓ log-option<br>          🔑 capture<br>          🔑 undetermined-transport<br>          🔑 icmp-off<br>          🔑 qos-group |

FIG.7

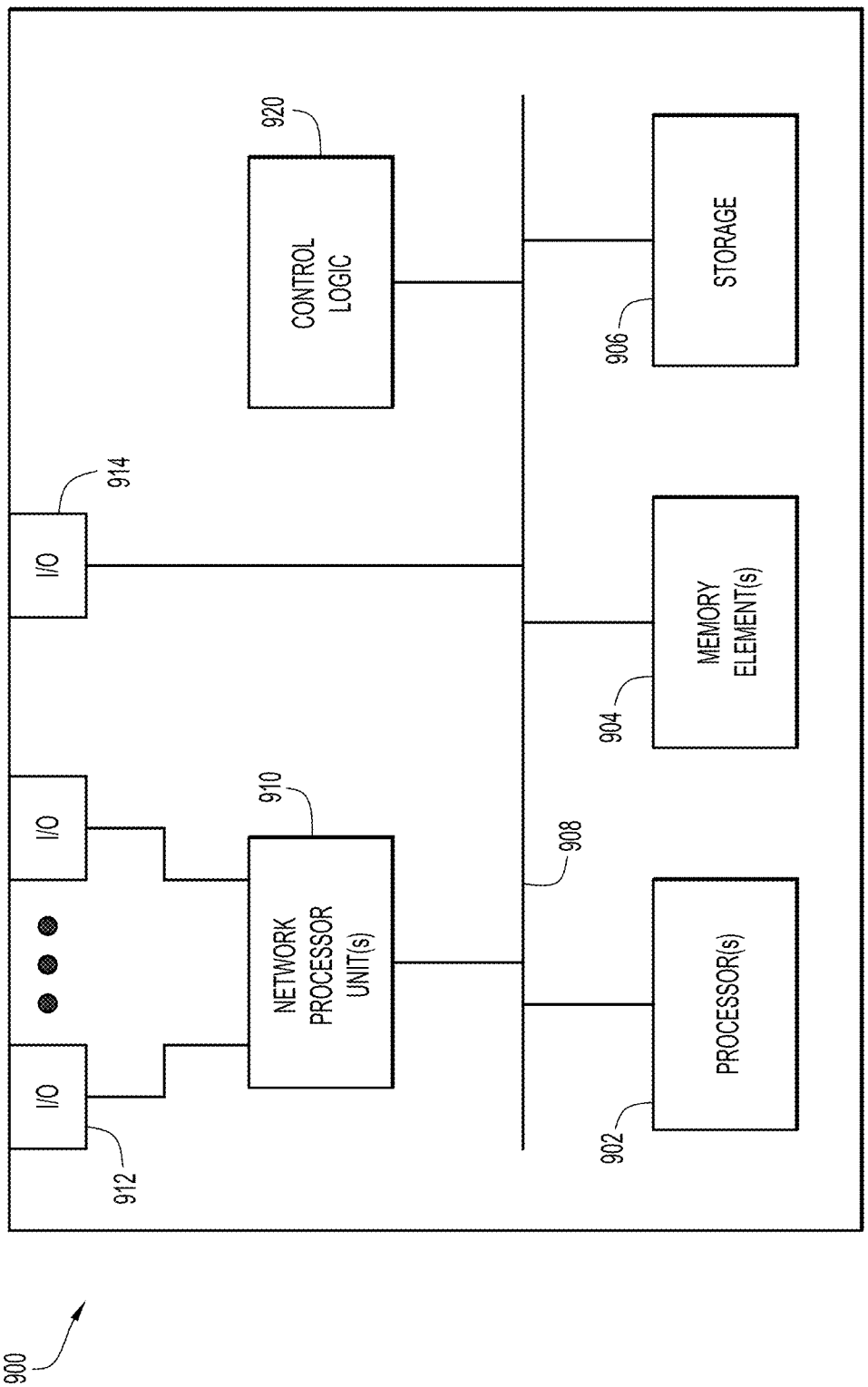

DYNAMIC AUGMENTATION FOR FUNCTIONALLY SIMILAR DATA MODELS ON NETWORK DEVICES

TECHNICAL FIELD

The present disclosure relates to data modeling on network devices.

BACKGROUND

Yet Another Generation (YANG) data model driven approaches to configuring network devices and retrieving configuration information from the network devices has become very popular. In the networking industry, many vendors/customers/forums, such as the Internet Engineering Task Force (IETF), OpenConfig, and Open Reconfigurable Optical Add/Drop Multiplexers (Roadm) (OpenRoadm) have created their own standard or non-native sets of data models. Responding to customer demand, vendors of network devices have begun to provision their network devices with the standard sets of data models in addition to data models that are native to the network devices, i.e., the native data models. While the native data models and the standard data models overlap functionally to a certain degree, the native data models generally provide access to a far wider range of configuration and state information than do the standard data models. Thus, many features of the network devices that are accessible under the native data models are not accessible to users constrained to interact with the network devices using only the standard data models.

BRIEF DESCRIPTION OF THE DRAWINGS

FIG. 6 is an illustration of data including augmented data for the interface properties produced by the dynamic augmentation of FIG. 5, according to an example embodiment.

FIG. 7 is an illustration of dynamic augmentation triggered by a GET request for access control list (ad) properties under an OpenConfig data model, according to an example embodiment.

FIG. 9 illustrates a hardware block diagram of a computing device corresponding to the network device that may perform functions associated with operations for dynamic augmentation, according to an example embodiment.

DESCRIPTION OF EXAMPLE EMBODIMENTS

Overview

Figure 1:
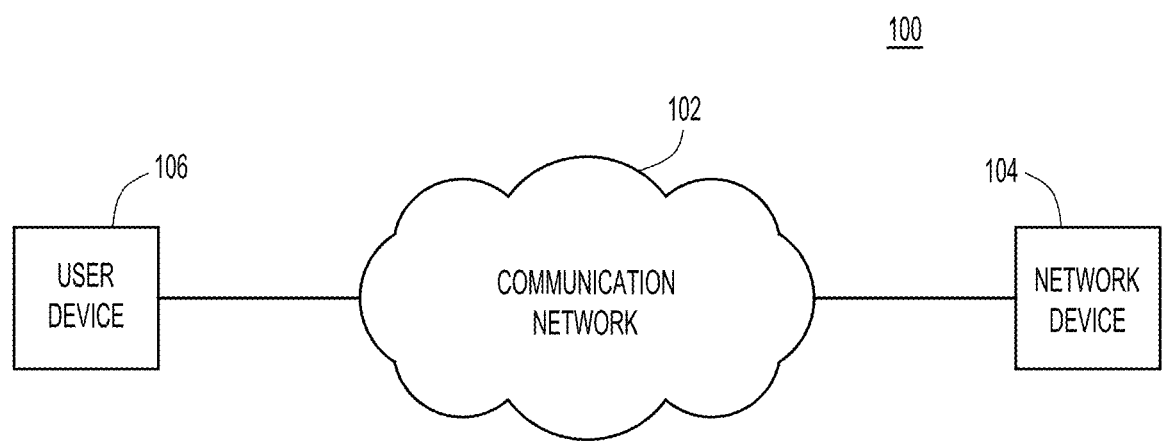
FIG. 1 is a block diagram of a network system in which dynamic augmentation of data associated with properties of data models may be implemented, according to an example embodiment.

A network device is provisioned with (i) a first data model of a first type and that models first properties for the network device, (ii) a second data model of a second type and that models second properties for the network device, and (iii) mappings that indicate mapped first properties among the first properties that are mapped to mapped second properties of the second properties that are functionally equivalent to the first properties. Upon receiving a request from a network for data for the first data model, the network device retrieves first data for the first properties of the first data model. The network device determines, based on the mappings, unmapped second properties of the second properties that are not mapped to any of the first properties and that are missing from the first data model. The network device retrieves, as dynamically augmented data, data for the unmapped second properties. The network device sends, to the network, a request response including the first data and the dynamically augmented data.

EXAMPLE EMBODIMENTS

Embodiments presented herein are described in the context of the Yet Another Next Generation (YANG) data modeling language (also referred to simply as "YANG") and the Network Configuration (NETCONF) Protocol (referred to simply as "NETCONF") by way of example, only. Other data modeling languages, and applications used to deploy and retrieve data models, may be used as alternatives to YANG and NETCONF, as would be appreciated by one of ordinary skill in the relevant arts having access to the present application.

YANG is a standards-based data modeling language used to create data models that define/model configuration and/or state properties (generally referred to as "properties") of network devices. More specifically, a YANG data model includes a hierarchy of nodes that define or represent the properties or attributes of a network device. The nodes may be arranged hierarchically in a tree topology or a table of rows, for example. Because the nodes represent/model the properties, the ensuing description uses the terms "nodes" and "properties" of a data model synonymously and interchangeably. Sometimes, the nodes/properties may also be referred to as configuration "knobs." The YANG data model has a structured format similar to a computer program that is human readable. There are different types or families of YANG data models. One type or family of YANG data models includes native or vendor specific data models that apply to vendor specific network device nodes (i.e., properties). Other types or families of YANG data models include standard or common YANG data models that apply to all vendors of network devices. The standard YANG data models may include OpenConfig, IETF, and OpenRoadm data models, and may be referred to as "non-native YANG data models," or simply "non-native data models."

NETCONF is a standards-based, Extensible Markup Language (XML) encoded protocol used to install, manipulate, and delete configuration and/or state properties of network devices based on YANG data models. NETCONF provides a transport to communicate YANG data models and operational data associated with the YANG data models between user devices and network devices. For example, NETCONF operations may configure network devices with YANG data models using SET requests, or request operational data from the network devices based on the YANG data models using GET requests. NETCONF may be configured as a client-server protocol in which a NETCONF client sends the SET/GET requests to a NETCONF server, which provides responses to the requests.

Native data models may include a large number of nodes tied closely to detailed features of a corresponding network device and thus define a large number of properties (e.g., 500,000 properties) spanning many functions of the network device. In contrast, a non-native data model (e.g., OpenConfig) defines a much smaller number of the properties (e.g., only 2,000 properties). Accordingly, dynamic augmentation presented herein dynamically augments the non-native data model with dynamically augmented data associated with portions of the native data model that are missing from the non-native data model. With dynamic augmentation, a user constrained to interact with the network device using only the non-native or standard data model can access the wider range of features that would otherwise be available only under the native data model. The network device may be triggered to perform dynamic augmentation by a GET request or similar command, and is thus performed by the network device dynamically, i.e., in real-time, while the network device processes the request.

With reference to FIG. 1, there is a block diagram of a network system 100 in which dynamic augmentation may be implemented. Network system 100 includes a communication network 102, a network device or node 104 connected to the communication network, and a client or user device 106 connected to the communication network. Network device 104 and client device 106 communicate with each other, e.g., send data packets to each other, over communication network 102 using any known or hereafter developed communication protocol. Network device 104 may include a router or switch, and may be implemented in hardware or virtually as an application hosted on a server, for example. Communication network 102 may include one or more wide area networks (WANs), such as the Internet, and one or more local area networks (LANs), for example. Network device 104 may instantiate NETCONF and be provisioned with native and non-native data models. Thus, network device 104 is configured to respond to SET and GET requests issued by user device 106. Network device 104 is configured to implement dynamic augmentation triggered by the GET requests, as described below.

Figure 2:
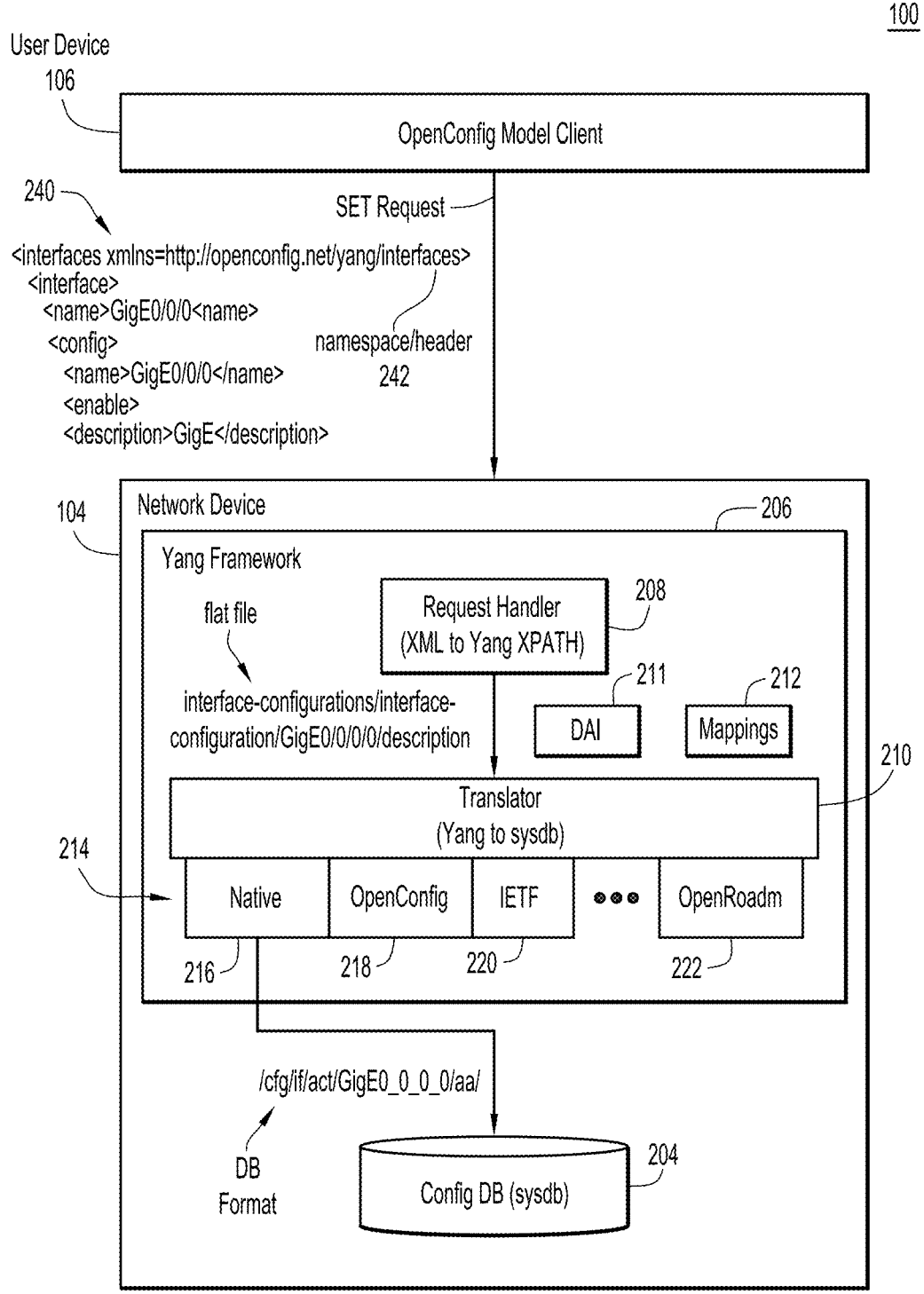
FIG. 2 is a block diagram of a network device useful for describing how a user device configures the network device using a SET request based on data models, according to an example embodiment.

With reference to FIG. 2, there is a block diagram of network system 100 that shows further details of network device 104 useful for describing how user device 106 configures network device 104 using a SET request based on data models. In the example of FIG. 2, user device 106 is configured to operate and process only OpenConfig data models, and is thus referred to as an "OpenConfig Model Client." User device 106 instantiates a NETCONF client that uses SET or GET requests to configure network device 104 or retrieve data/values (referred to generally as data) for the configuration and/or state properties from the network device based on/under the OpenConfig data model. As used herein, the term "data model" may also be referred to simply as "model."

Network device 104 includes a configuration database (DB) 204 (e.g., a sysdb-based database service) to store configuration and state properties and their associated data/values (collectively and more generally referred to as "information") for the network device, and a YANG/NETCONF framework (referred to as "Yang framework" in FIG. 2) 206 to communicate with the configuration database and user device 106, and with various other network device functions, such as interfaces, ports, and the like, not shown in FIG. 2. YANG framework 206 includes: a request handler 208; a YANG translator (also referred to simply as a "translator") 210 to translate between XML and flattened YANG paths and to communicate with configuration database 204 and the request handler; a configurable dynamic augmentation indicator (DAI) 211 to indicate whether dynamic augmentation as presented herein is enabled (e.g., DAI values 1 and 0 respectively indicate that dynamic augmentation is enabled and disabled); predetermined data model mapping information or contracts (referred to simply as "mappings") 212; and a suite of YANG data models 214 of different types or families to model properties of network device 104. The aforementioned components of YANG framework 206 may include dynamic augmentation modules/logic that implement dynamic augmentation according to embodiments presented herein. Dynamic augmentation indicator 211, mappings 212, and YANG data models 214 may all be provisioned on network device 104 by a network administrator or other network management entity during an a priori provisioning operation.

In the example of FIG. 2, YANG data models 214 include native or proprietary data models 216 and non-native data models that include, but are not limited to, OpenConfig (OC) data models 218, IETF data models 220, and OpenRoadm data models 222. Other types of data models are possible. For the sake of clarity, in FIG. 2, YANG data models 214 are depicted as being separate from configuration database 204 and translator 210. In practice, however, YANG data models 214 may be implemented as an abstraction layer on top of configuration database 204 that leverages both the configuration database and translator 210 for instantiation. For example, in a Cisco network device, the Internetworking Operating System (IOS)-XR exposes multiple types of data models for configuration database 204, and identifies the different types using different prefixes. For example, the native data models start with a prefix "Cisco-IOS-XR-." On the other hand, OpenConfig data models start with a prefix "OpenConfig-" and so on for the other types of data models. For example, an access control list (acl) function/component of a native data model may include a header/namespace "Cisco-IOS-XR-um-acl-cfg.yang," while a corresponding OpenConfig data model may include a header/namespace "OpenConfig-acl.yang."

Native data models 216 may define a large number of properties/nodes (e.g., 500,000 properties) spanning many functions of the network device. In contrast, each of the non-native data models (e.g., OpenConfig) may define many fewer properties (e.g., 2,000 properties). Thus, native data models 216 typically define many properties of network device 104 that are not defined by, and thus are missing from, each of the non-native data models.

Generally, mappings 212 are configured to map individual "native" nodes of native data models 216 to corresponding or matching "non-native" nodes of each of the other non-native data models 218-222 that are functionally equivalent to the native nodes of the native data models. Nodes are functionally equivalent to each other when they represent the same configuration and/or state properties for network device 104. For example, mappings 212 include OpenConfig mappings that map OpenConfig nodes of OpenConfig data models 218 to their corresponding native nodes in native data models 216, IETF mappings that map IETF nodes of IETF data models 220 to their corresponding native nodes in the native data models, and so on. Network device 104 may be provisioned with predetermined OpenConfig mappings, IETF mappings, and so on when the network device is provisioned with OpenConfig data models 218, IETF data models 220, and so on.

Figure 3:
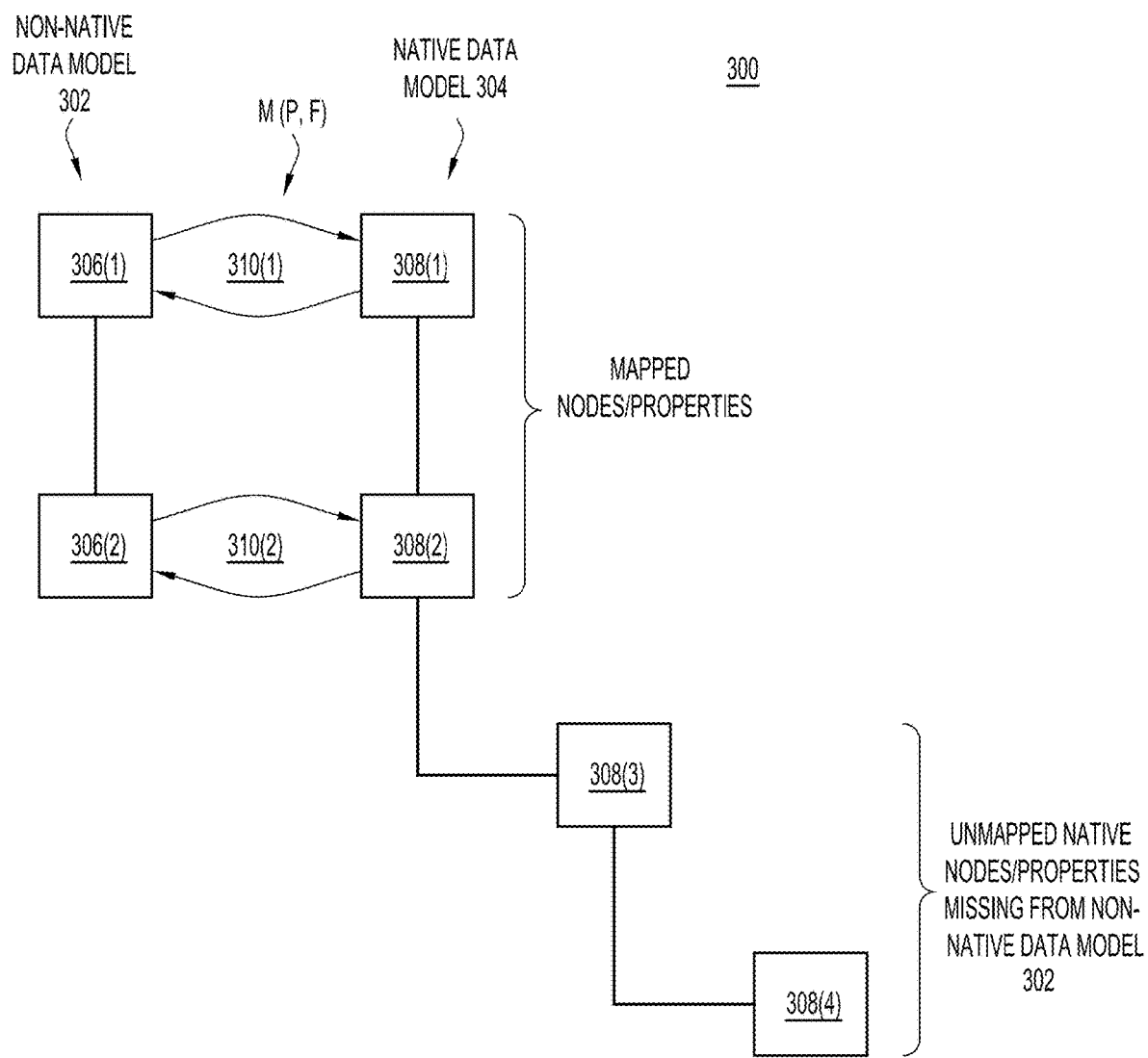
FIG. 3 is an illustration of mappings between equivalent nodes of standard and native data models provisioned on the network device, according to an example embodiment.

With reference to FIG. 3, there is an illustration of a simplified example 300 that shows mappings M between a non-native data model 302 (e.g., a standard data model, such as an OpenConfig data model) and a native data model 304. The two data models model a functionally similar network device function, such as network interfaces of the network device. Non-native data model 302 includes a first set of non-native nodes 306(1) and 306(2), while native data model 304 includes a fuller set of native nodes 308(1)-308(4). The total number of native nodes exceeds the number of non-native nodes. Mappings M include bidirectional pointers or links 310(1) and 310(2) that map non-native nodes 306(1) and 306(2) to functionally equivalent native nodes 308(1) and 308(2). Mappings M leave native nodes 308(3) and 308(4) unmapped. The properties defined/represented by unmapped native nodes 308(3) and 308(4) are missing from non-native data model 302. Mappings M also include hierarchical/positional information P for the mapped nodes (e.g., for mapped non-native nodes 306(1) and 306(2), and for mapped native nodes 308(1) and 308(2)) in their respective hierarchies. Hierarchical information P may indicate parent-child relationships between the mapped nodes, for example. Mappings M may also include flags F or "checks" that indicate which of the native and non-native nodes are mapped, and which are unmapped.

Returning to FIG. 2, operations performed by network device 104 to process a Set request issued by user device 106 are now described. User device 106 (i.e., the NETCONF client on the user device) sends the SET request to network device 104 over network 102 (not shown in FIG. 2). The SET request includes an instantiation of a simple OpenConfig data model 240 to configure interfaces of network device 104. OpenConfig data model 240 includes a header/namespace 242 that includes identifiers that identify/indicate the type/family of data model "openconfig," the modeling language "YANG," and the function "interfaces" that is targeted, i.e., the function to be configured under the data model. OpenConfig data model 240 also includes a name "GigE0/0/0" of an interface and an action "enable" to be performed on the interface. In OpenConfig data model 240, each line may be considered to correspond to a respective node or property defined by the data model.

Request handler 208 receives the SET request, converts the instantiation of the OpenConfig data model 240 to a flattened form or a flat YANG path, and provides the same to translator 210. Translator 210 converts the flat YANG path to a descriptor understood by configuration database 204, and configures the configuration database based on the descriptor, which thereby configures network device 104 based on OpenConfig data model 240.

Figure 4:
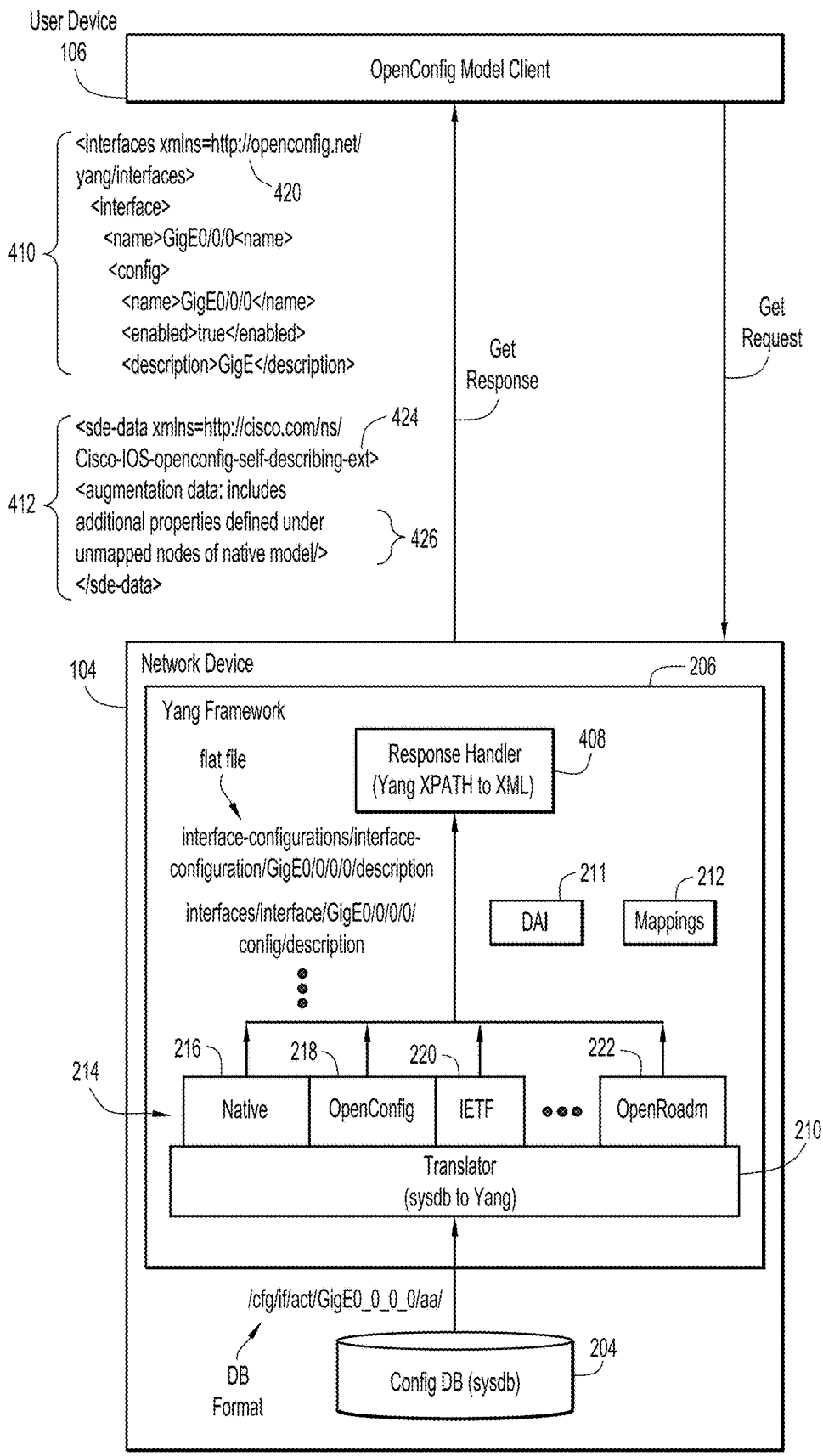
FIG. 4 is a block diagram that shows details of the network device useful for describing retrieval of configuration and/or state information from the network device using a GET request to trigger dynamic augmentation, according to an example embodiment.

With reference to FIG. 4, there is a block diagram of network system 100 that shows further details of network device 104 useful for describing retrieval of data for configuration and/or state properties from network device 104 using a GET request issued by user device 106. In the example of FIG. 4, it is assumed that dynamic augmentation indicator 211 is set to indicate that dynamic augmentation is enabled.

User device 106 sends, to network device 104, the GET request under the OpenConfig data model to solicit/retrieve data for properties for an interfaces function of network device 104, for example. In other words, the GET request may include a header/namespace similar to OpenConfig model 240 that includes identifiers that identify the type/family of data model "openconfig," the modeling language "YANG," and the function "interfaces" for which configuration and/or state information is to be retrieved, e.g., "<interfaces xmlns=http://openconfig.net/YANG/interfaces>." Processing of the GET request is described in the context of the OpenConfig interfaces function by way of example, only. It is understood that the GET request may be directed to any function of network device that is modeled by a non-native data model.

YANG framework 206 of network device 104 includes a response handler 408 to handle the GET request, and ultimately forward a GET response back to user device 106. Response handler 408 receives the GET request, converts it to a flattened form or a flat YANG path, and provides the same to translator 210. Response handler 408 also determines whether dynamic augmentation is enabled based on dynamic augmentation indicator 211. In this example, because dynamic augmentation is enabled, response handler 408 triggers translator 210 to perform dynamic augmentation when processing the GET request. On the other hand, when dynamic augmentation is not enabled, dynamic augmentation is not triggered.

Responsive to the flattened request and dynamic augmentation trigger provided by response handler 408, translator 210 initially retrieves data for the set of OpenConfig nodes of OpenConfig data models 218 that define/correspond to the interfaces function, i.e., that represent properties for the interfaces functions. This set of OpenConfig nodes collectively represent an OpenConfig data model for the interfaces function, and they are mapped to corresponding native nodes of native data models 216 for the interfaces function in mappings 212. The aforementioned data may be retrieved from any functional components of network device 104 to which the OpenConfig nodes pertain. The functional components may include, for example, any software, hardware, and/or firmware components of network device 104, such as database 204, network interfaces, interface counters, and the like.

Next, translator 210 performs dynamic augmentation to augment the data for the OpenConfig nodes for the interfaces function (i.e., to augment the initially retrieved data) with data for native nodes of native data models 216 that also define the interfaces function, but that are missing from OpenConfig data models 218. First, translator 210 analyzes mappings 212 to determine/identify which of the native nodes of native data models 216 relevant to the interfaces function are not mapped to any OpenConfig nodes of OpenConfig data models 218. That is, translator 210 determines unmapped native nodes of native data models 216 that are missing from OpenConfig data models 218. Some of the unmapped native nodes may be used for dynamic augmentation (as described below), while others may not. For example, unmapped native nodes for which actual runtime/operational data/values exist on network device 104 may be used, while unmapped native nodes for which actual runtime/operational data/values do not exist on the network device may not be used. In a further example, unmapped native nodes that are associated with special augmentation indicators in the predetermined mappings may be used.

Second, once translator 210 identifies unmapped native nodes (referred to as "identified mapped native nodes") to be used, translator 210 retrieves the operational/runtime data for the identified unmapped native nodes. The retrieved operational/runtime data is referred to as "dynamically augmented data" (or simply as "augmented data") that is for/associated with the unmapped native nodes of the native data model. The dynamically augmented data may be retrieved from any functional component of network device 104 to which the unmapped native nodes pertain. The functional component may include, for example, any software, hardware, and/or firmware component of network device 104, such as database 204, network interfaces, interface counters, and the like.

Third, translator 210 determines where to insert the augmented data in the hierarchy of the OpenConfig data model for the interfaces function based on hierarchical (ancestral) and mapping information for OpenConfig data models 218 and native data models 216 in mappings 212. That is, translator 210 determines an insertion position represented by a common node in the hierarchy of the OpenConfig data model for the interfaces function under which to insert the augmented data. The common node is so named because it is common to the augmented data to be inserted under that common node. In various situations, there may be multiple common nodes under which respective blocks of augmented data will be inserted. Once the common node is determined, translator 210 inserts the augmented data into the OpenConfig data model for the interfaces function as a subtree under the common node. The inserted subtree preserves a hierarchy/structure/order of the unmapped native nodes in the subtree, as it exists in native data models 216. Examples operations used to determine the common node are described below in connection with FIGS. 5-7.

Fourth, translator 210 provides (i) the data for the OpenConfig data model, and (ii) the augmented data for the interfaces function to response handler 408. Response handler 408 generates a GET response (in response to the GET request) that includes both the data for the OpenConfig data model and the augmented data, and sends the GET response to user device 106. The GET response presents the data for the OpenConfig data model and the augmented data in an order that reflects the order of the nodes of the OpenConfig data model to which the data pertains and with the augmented data inserted under the common node. Network device 104 sends the GET response (more generally referred to as the "request response") to user device 106 over network 102. For example, the GET response includes a first segment 410 that presents the data for the OpenConfig data model for the interfaces function, and a second segment 412 that presents the augmented data based on the unmapped/leftover native nodes for the interfaces function.

First segment 410 includes a header/namespace 420, similar to header/namespace 242 of instantiated OpenConfig data model 240, that includes identifiers to identify the type/family of data model "openconfig," the modeling language "YANG," and the function "interfaces" for which data for properties/nodes was retrieved, e.g., "<interfaces xmlns=http://openconfig.net/YANG/interfaces>." First segment 410 also includes data for properties/nodes, such as the name "GigE0/0/0," of the specific interface targeted by the GET request, and a property "enabled" to indicate that the interface is configured and enabled.

Second segment 412 includes a header 424 that introduces the second segment as a self-describing extension (SDE) to first segment 410. Second segment 412 further includes augmented data 426 that includes data for the additional properties of the interface function represented by the unmapped native nodes identified for use by the dynamic augmentation. The SDE may be presented in a form of XML encoding, similar to another form of JavaScript Object Notation (JSON)/proto encoding for Representational State Transfer Configuration Protocol (RESTCONF)/gRPC (g) Network Management Interface (NMI) (gNMI) workloads.

The SDE may also be presented with a common generic structure to anyxml/anydata block under a namespace that would facilitate a path compression scheme as part of the anyxml/anyjson block.

Further examples of dynamic augmentation and augmented data are now described in connection with FIG. 5-7, which also provide further insight into how common nodes are determined in the OpenConfig data model.

Figure 5:
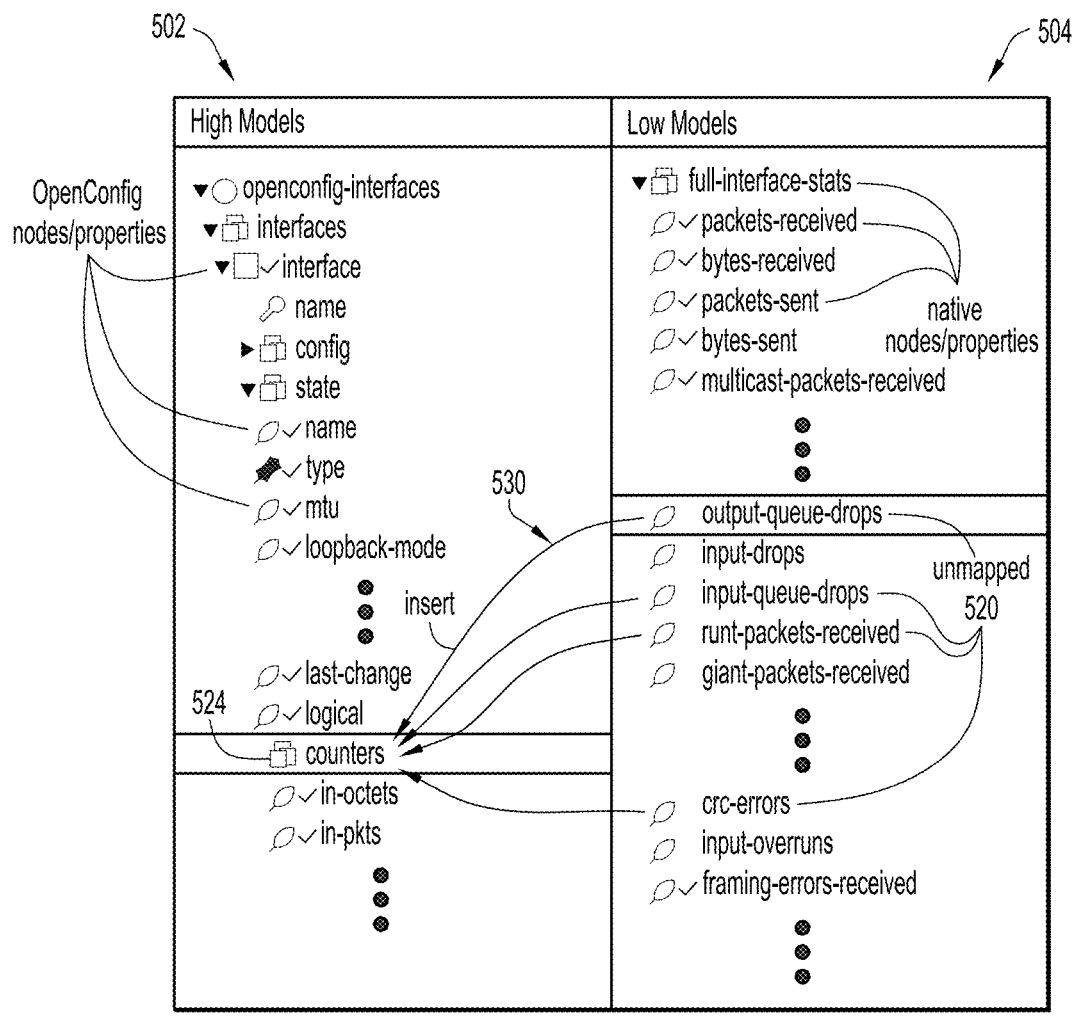
FIG. 5 is an illustration of dynamic augmentation triggered by a GET request for interface properties under an OpenConfig data model, according to an example embodiment.

With reference to FIG. 5, there in an illustration of another example 500 of dynamic augmentation triggered by a GET request for "interfaces" using an OpenConfig data model. In the example of FIG. 5, network device 104 is provisioned with OpenConfig data models 502 (referred to as "High Models" in FIG. 5) and native data models 504 (referred to as "Low Models" in FIG. 5) for the interfaces function of network device 104. Check-marked native nodes of native data model 504 are mapped to functionally equivalent check-marked OpenConfig nodes of OpenConfig data model 502, while unchecked native nodes 520 of the native data model are not mapped to any OpenConfig nodes, and thus represent unmapped native nodes. Unmapped native nodes 520 are missing from OpenConfig data model 502.

As described above, in response to a GET request for interfaces under an OpenConfig data model, dynamic augmentation performs the following operations:

a. Search native (interfaces) data model 504 to identify unmapped native nodes 520 that are missing from OpenConfig (interfaces) data model 502. The search ignores unmapped native nodes for which actual operational/runtime data does not exist.

Under native data model 504, unmapped native nodes 520 collectively define/represent detailed counter properties for interfaces, including output-queue-drops, input-queue-drops, runt-packets-received, and so on.

b. Once unmapped native nodes 520 are identified, determine a common node 524 in the hierarchy of OpenConfig data model 502 under which to insert data (i.e., augmented data) for the unmapped native nodes as a subtree. To determine the common node, identify, as the common node, an OpenConfig node (in this case, OpenConfig node 524) that defines a function (e.g., counters) that is functionally equivalent to, and thus corresponds to/encompasses, the counter function(s) represented by unmapped native nodes 520. In another example, the common node may be determined by (i) identifying a mapped native node that is a parent to unmapped native nodes 520, and (ii) identifying the OpenConfig node that is mapped to the mapped native node—then using that OpenConfig node as the common node.

c. Once the common node is determined, insert the augmented data under the common node/OpenConfig node 524, as indicated by insertion arrows 530 in FIG. 5.

Next, network device 104 sends the data for the OpenConfig data model and the augmented data for the unmapped native nodes of the native data model to user device 106 in a GET response that preserves the order of the data in the OpenConfig data model with the augmented data inserted, as shown in FIG. 6, for example.

With reference to FIG. 6, there is an illustration of data 600 for configuration and/or state properties of the interfaces function produced in the example of FIG. 5 and that may be returned in the GET response. A first segment 602 is introduced by header "interfaces xmlns=http://openconfig-.net/YANG/interfaces" to indicate that the first segment includes data associated with the OpenConfig data model for the interfaces. First segment 602 also presents interface data for configuration and state properties, e.g., interface name Ether1 and counter value 989898.

A second segment 604 includes augmented data produced by dynamic augmentation, and is introduced by a header 606 "<sde-data xmlns=http://cisco.com/ns/Cisco-IOS-openconfig-self-describing-ext>" to indicate that the second segment is a self-describing extension to the preceding data associated with the OpenConfig data model. Following header 606, a line 608 indicates that the source for the self-describing extension is a native data model "<nodes xmltagsns:sde-source-path=Cisco-IOS-XR-pfi-cmd-oper:interface-xr/interface/interface-statistics/full-nterface-stats>." At lines 610, the self-describing extension presents data in the form of state values "99997," "99998," and "99999" for detailed counter functions output-queue-drops, input-queue-drops, and runt-packet-received-queue-drops, respectively, from native data model 504.

With reference to FIG. 7, there in an illustration of a further example of dynamic augmentation 700 triggered by a GET request for access control list (ad) properties configured under an OpenConfig data model. In the example of FIG. 7, network device 104 is provisioned with OpenConfig data models 702 (referred to as High Models in FIG. 7) and at least two native data models 704, 706 (referred to as Low Models) for acl configuration (config). OpenConfig data models 702 include a single hierarchy that lists (i) ad config for Layer-2 (L2)/Ethernet 707, and (ii) ad config for Internet Protocol (IP) version (v) 6 (IPv6) 708. On the other hand, native data models 704 list node(s) 730 directed to acl config for Ethernet/L2, while native data models 706 separately list node(s) 732 directed to ad config for IPv6.

In response to a GET request for ad config for L2/Ethernet under the OpenConfig data model, dynamic augmentation (i) determines relevant unmapped native nodes 740 under "destination-network" 734 of native data model 704 that are missing from OpenConfig data model 702, (ii) determines L2/config node 707 as a first common node in OpenConfig data model 702 for data associated with unmapped native nodes 740 because several Openconfig nodes under 707 serve "destination functions" similar to unmapped native nodes 740 (i.e., which is an example of determining the first common node based on functional similarity between the unmapped native nodes and the first common node, described above), and (iii) inserts the data associated with the missing native nodes (i.e., first augmented data) at the first common node, as indicated by insertion arrows 742.

In response to a GET request for ad config for IPv6 under the OpenConfig data model, dynamic augmentation (i) determines relevant unmapped native nodes 750 of native data models 706 that are missing from OpenConfig data model 702, (ii) determines IPv6/config node 708 as a second common node in OpenConfig data models 702 for data associated with unmapped native nodes 750, and (iii) inserts the data associated with the missing native nodes (i.e., second augmented data) for acl config for IPv6 at the second common node, as indicated by insertion arrows 754.

A combination of data for the OpenConfig data models and the first and second augmented data produced by the above-described dynamic augmentation may be presented in a GET response. The GET response presents (i) data for the OpenConfig data models, and (ii) data for the unmapped native nodes 740 and 750 as respective self-describing extensions.

Summarizing the examples described above, data associated with/for unmapped native nodes that are not covered by the OpenConfig data models, and that actually exists operationally/in runtime on components of network device 104, is delivered as dynamically augmented data under a header/namespace self-defining extension (SDE) at a common node in the hierarchy of a non-native data model (e.g. an OpenConfig data model). The augmented data represents a subtree of the non-native hierarchy. Dynamic augmentation relies on both types of data models (native and non-native or standard data models (e.g., OpenConfig)) and existing mappings between non-native nodes and native nodes, which represent a "source of truth." During Get request processing, the network device traverses mappings 212 between the non-native nodes and the native nodes, and infers and intelligently analyzes mapping node/object relationships to compute the augmentation point or position (i.e., the common node) at which to insert data associated with leftover/unmapped native nodes as a subtree in a namespace for the unmapped native nodes e.g., "Cisco-IOS-openconfig-self-describing-extension." This self-describing subtree can be inserted at any common node wherever a placement match is detected and ancestor mapping is available. The network device may use a custom trigger already included in ancestor mapping.

Figure 8:
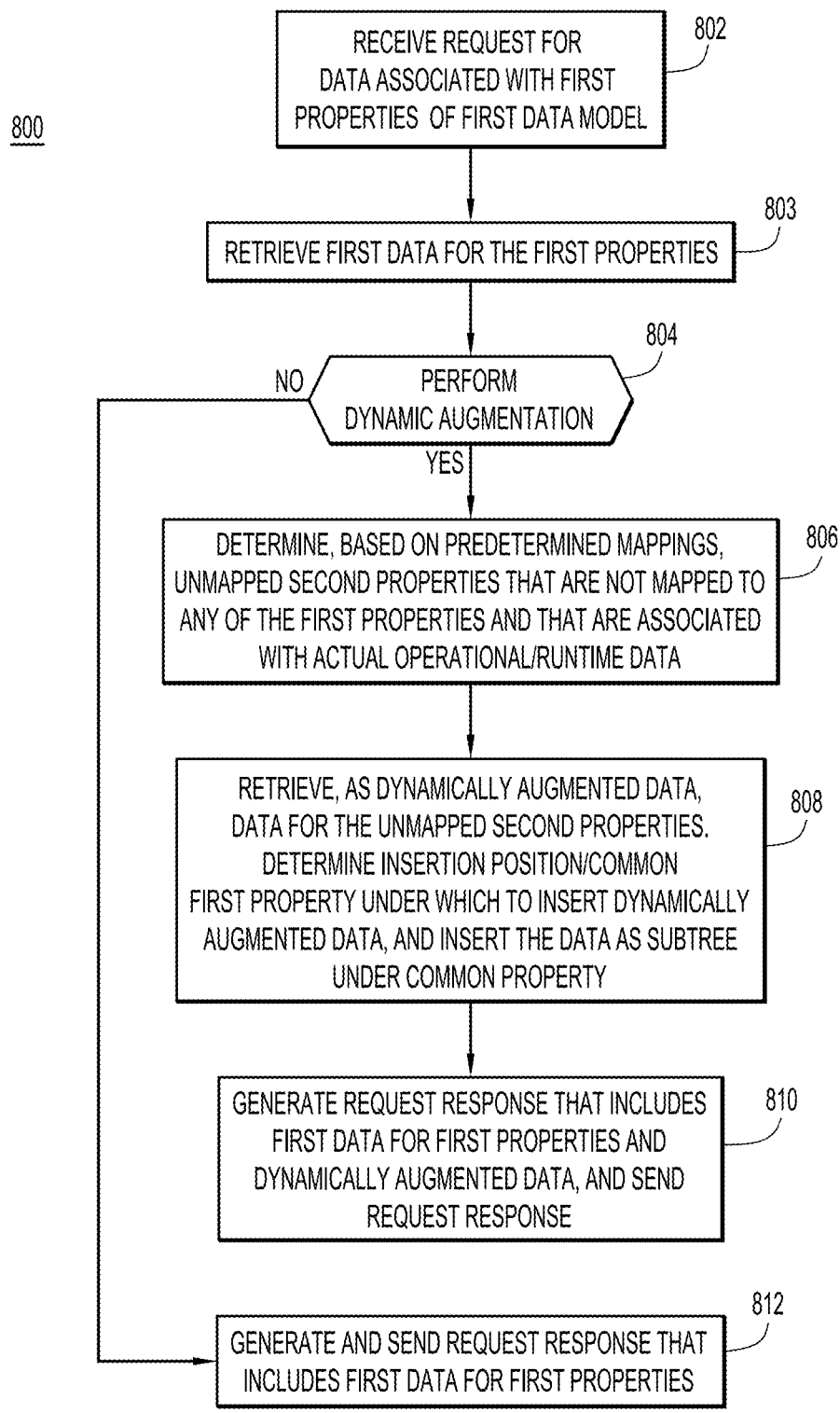
FIG. 8 is a flowchart of a method of performing dynamic augmentation performed by the network device, according to an example embodiment.

FIG. 8 is a flowchart of an example method 800 of performing dynamic augmentation performed by a network device (e.g., network device 104). Method 800 includes various operations described above. The ensuing description of method 800 replaces "nodes" with "properties." Method 800 assumes that the network device includes memory provisioned with configuration information including:

a. A first data model of a first type. The first data model may be a non-native data model that is not native to the network device, such as an OpenConfig data model. The first data model models first properties (e.g., non-native properties, such as OpenConfig properties), including first configuration and/or state properties, for the network device. The first properties are arranged in a first hierarchy.

b. A second data model of a second type (e.g., a native data model) that models second properties, including second configuration and/or state properties. The second data model is functionally similar, but not equivalent, to the first data model. For example, the first and second data models model the same function with the first properties and the second properties, but the first properties and the second properties are not identical to each other, i.e., there are differences between the first properties and the second properties. In addition, the second properties extend beyond, but overlap, the first properties. The second properties are arranged in a second hierarchy. A total number of the first properties may be substantially less than a total number of the second properties.

c. Predetermined mappings that indicate mapped first properties among the first properties that are mapped to mapped second properties among the second properties that are functionally equivalent to the first properties. The predetermined mappings also indicate ancestral (parent-child) relationships between properties in each of the data models.

d. A dynamic augmentation indicator that indicates whether the network device is enabled for dynamic augmentation.

At 802, the network device receives, from a network, a request (e.g., a GET request or similar command) soliciting data for the first properties of the first data model.

In response to the request, at 803, the network device accesses the configuration information provisioned on the network device, and retrieves first data that exists on the network device for the first properties. The first data may be retrieved from any functional (virtual and non-virtual) components of the network device to which the first properties pertain, which may include software, hardware, and/or firmware components of the network device.

Also in response to the request, at 804, the network device determines whether to perform dynamic augmentation based on the dynamic augmentation indicator. When the network device is to perform dynamic augmentation, flow proceeds to 806-810. When the network device is not to perform dynamic augmentation, the network device does not perform dynamic augmentation, and flow proceeds to operation 812.

At 806, the network device examines the predetermined mappings to determine unmapped second properties that are not mapped to any of the first properties and are, therefore, missing from the first data model. In an embodiment, the network device also determines for which of the unmapped second properties operational/runtime data actually exists on the network device, and tags/identifies those unmapped second properties for use in next operations 808 and 810.

At 808, the network device retrieves, as dynamically augmented data, data for the unmapped second properties (the tagged unmapped second properties) that exists on the network device. The dynamically augmented data includes operational/runtime data for the unmapped second properties that exists on the network device. The dynamically augmented data may be retrieved from any functional (virtual and non-virtual) components of the network device to which the unmapped second properties pertain, which may include software, hardware, and/or firmware components of the network device.

The network device determines an augmentation position/common first property among the first properties in the first hierarchy under which to insert the dynamically augmented data, and inserts the dynamically augmented data into the first hierarchy under the common property. The network device may identify the common first property as a first mapped property among the first properties that is functionally similar to the unmapped second properties. Alternatively, the network device may identify a mapped second property among the mapped second properties in the second hierarchy that is a parent of the unmapped second properties, and then use, as the common first property, a mapped first property among the mapped first properties that is mapped to the mapped second property.

At 810, the network device generates a request response that includes the data for the first properties retrieved at 803 and the dynamically augmented data. The request response presents the first data and the dynamically augmented data in an order that reflects an order of the first properties in the first hierarchy with the augmented data inserted under the common first property. The network device sends the request response to the network. The request response includes a first segment that presents the data for the first properties with a first header to indicate that the data for the first properties belongs to or is associated with the first data model of the first type, and a second segment that presents the data for the unmapped second properties (i.e., the dynamically augmented data) with a second header to indicate that the data for the second unmapped properties is an extension, such as a self-describing extension.

At 812, the network device generates a request response that only includes the data for the first model, and sends that request response to the network.

Referring to FIG. 9, FIG. 9 illustrates a hardware block diagram of a computing device 900 that may perform functions associated with operations discussed herein in connection with the techniques depicted in FIGS. 1-8. In various embodiments, a computing device, such as computing device 900 or any combination of computing devices 900, may be configured as any entity/entities, e.g., network device/node 104 and user device 106, as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: at a network device provisioned with a first data model of a first type and that models first properties for the network device, a second data model of a second type and that models second properties for the network device, and mappings that indicate mapped first properties among the first properties that are mapped to mapped second properties of the second properties that are functionally equivalent to the first properties, upon receiving a request from a network for data for the first data model: retrieving first data for the first properties of the first data model; determining, based on the mappings, unmapped second properties of the second properties that are not mapped to any of the first properties and that are missing from the first data model; retrieving, as dynamically augmented data, data for the unmapped second properties; and sending, to the network, a request response including the first data and the dynamically augmented data.

In another form, an apparatus is provided comprising: one or more network input/output interfaces; memory provisioned with a first data model of a first type and that models first properties for a network device, a second data model of a second type and that models second properties for the network device, and mappings that indicate mapped first properties among the first properties that are mapped to mapped second properties of the second properties that are functionally equivalent to the first properties; and a processor coupled to the network input/output interfaces and the memory, the processor configured to perform, upon receiving a request from a network for data for the first data model: retrieving first data for the first properties of the first data model; determining, based on the mappings, unmapped second properties of the second properties that are not mapped to any of the first properties and that are missing from the first data model; retrieving, as dynamically augmented data, data for the unmapped second properties; and sending, to the network, a request response including the first data and the dynamically augmented data.

In yet another form, a non-transitory computer readable medium is provided. The computer readable medium stores instructions that, when executed by a processor of a network device provisioned with a first data model of a first type and that models first properties for the network device, a second data model of a second type and that models second properties for the network device, and mappings that indicate mapped first properties among the first properties that are mapped to mapped second properties of the second properties that are functionally equivalent to the first properties, cause the processor to perform, upon receiving a request from a network for data for the first data model: retrieving first data for the first properties of the first data model; determining, based on the mappings, unmapped second properties of the second properties that are not mapped to any of the first properties and that are missing from the first data model; retrieving, as dynamically augmented data, data for the unmapped second properties; and sending, to the network, a request response including the first data and the dynamically augmented data.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a network device provisioned with a first data model of a first type and that models first properties for the network device, a second data model of a second type and that models second properties for the network device, and mappings that indicate mapped first properties among the first properties that are mapped to mapped second properties of the second properties that are functionally equivalent to the first properties, upon receiving a request from a network for data for the first data model:
retrieving first data for the first properties of the first data model;
determining, based on the mappings, unmapped second properties of the second properties that are not mapped to any of the first properties and that are missing from the first data model;
retrieving, as dynamically augmented data, data for the unmapped second properties; and
sending, to the network, a request response including the first data and the dynamically augmented data.

2. The method of claim 1, wherein:
the first properties include first configuration and/or state properties, and the first data includes first data for the first configuration and/or state properties; and
the unmapped second properties include unmapped second configuration and/or state properties, and the dynamically augmented data includes dynamically augmented data for the unmapped second configuration and/or state properties.

3. The method of claim 1, wherein:
the determining includes determining, as the unmapped second properties, unmapped second properties that are not mapped to any of the first properties and for which operational data exists on the network device.

4. The method of claim 1, wherein the sending the request response includes sending the request response to include:
a first segment that presents the first data with a first header to indicate that the first data is based on the first data model of the first type; and
a second segment that presents the dynamically augmented data with a second header to indicate that the dynamically augmented data is a self-describing extension based on the second data model of the second type.

5. The method of claim 1, wherein the first properties are arranged in a first hierarchy, and the method further comprises:
determining a common first property among the first properties in the first hierarchy under which to insert the dynamically augmented data; and
inserting the dynamically augmented data in the first hierarchy under the common first property.

6. The method of claim 5, wherein the determining the common first property includes:
identifying, as the common first property, one of the first properties that is similar to the unmapped second properties.

7. The method of claim 5, wherein the second properties are arranged in a second hierarchy and the determining the common first property includes:
identifying a mapped second property among the mapped second properties in the second hierarchy that is a parent of the unmapped second properties; and
using, as the common first property, a mapped first property among the mapped first properties that is mapped to the mapped second property.

8. The method of claim 1, wherein the first data model is functionally similar, but not equivalent, to the second data model, and a first total number of the first properties is less than a second total number of the second properties.

9. The method of claim 1, wherein:
the first data model is not native to the network device; and
the second data model is native to the network device.

10. The method of claim 9, wherein the first data model includes a native Yet Another Next Generation (YANG) data model and the second data model includes one of an OpenConfig YANG data model, an Internet Engineering Task Force (IETF) YANG data model, and an Open Reconfigurable Optical Add/Drop Multiplexers (ROADM) (OpenRoadm) YANG data model.

11. The method of claim 1, further comprising:
determining whether to perform dynamic augmentation based on an indicator provisioned on the network device; and
when the dynamic augmentation is to be performed, performing the retrieving the first data, the determining the unmapped second properties, the retrieving the dynamically augmented data, and the sending.

12. An apparatus comprising:
one or more network input/output interfaces;
memory provisioned with a first data model of a first type and that models first properties for a network device, a second data model of a second type and that models second properties for the network device, and mappings that indicate mapped first properties among the first properties that are mapped to mapped second properties of the second properties that are functionally equivalent to the first properties; and
a processor coupled to the one or more network input/output interfaces and the memory, the processor configured to perform, upon receiving a request from a network for data for the first data model:
retrieving first data for the first properties of the first data model;
determining, based on the mappings, unmapped second properties of the second properties that are not mapped to any of the first properties and that are missing from the first data model;
retrieving, as dynamically augmented data, data for the unmapped second properties; and
sending, to the network, a request response including the first data and the dynamically augmented data.

13. The apparatus of claim 12, wherein:
the first properties include first configuration and/or state properties, and the first data includes first data for the first configuration and/or state properties; and
the unmapped second properties include unmapped second configuration and/or state properties, and the dynamically augmented data includes dynamically augmented data for the unmapped second configuration and/or state properties.

14. The apparatus of claim 12, wherein:
the processor is configured to perform the determining by determining, as the unmapped second properties, unmapped second properties that are not mapped to any of the first properties and for which operational data exists on the network device.

15. The apparatus of claim 12, wherein the processor is configured to perform the sending by sending the request response to include:
a first segment that presents the first data with a first header to indicate that the first data is based on the first data model of the first type; and
a second segment that presents the dynamically augmented data with a second header to indicate that the dynamically augmented data is a self-describing extension based on the second data model of the second type.

16. The apparatus of claim 12, wherein the first properties are arranged in a first hierarchy, and the processor is further configured to perform:

determining a common first property among the first properties in the first hierarchy under which to insert the dynamically augmented data; and
inserting the dynamically augmented data in the first hierarchy under the common first property.

17. The apparatus of claim 16, wherein the processor is configured to perform the determining the common first property by:
identifying, as the common first property, one of the first properties that is functionally similar to the unmapped second properties.

18. A non-transitory computer readable medium encoded with instructions that, when executed by a processor of a network device provisioned with a first data model of a first type and that models first properties for the network device, a second data model of a second type and that models second properties for the network device, and mappings that indicate mapped first properties among the first properties that are mapped to mapped second properties of the second properties that are functionally equivalent to the first properties, cause the processor to perform, upon receiving a request from a network for data for the first data model:
retrieving first data for the first properties of the first data model;
determining, based on the mappings, unmapped second properties of the second properties that are not mapped to any of the first properties and that are missing from the first data model;
retrieving, as dynamically augmented data, data for the unmapped second properties; and
sending, to the network, a request response including the first data and the dynamically augmented data.

19. The non-transitory computer readable medium of claim 18, wherein:
the first properties include first configuration and/or state properties, and the first data includes first data for the first configuration and/or state properties; and
the unmapped second properties include unmapped second configuration and/or state properties, and the dynamically augmented data includes dynamically augmented data for the unmapped second configuration and/or state properties.

20. The non-transitory computer readable medium of claim 18, wherein:
the instructions to cause the processor to perform the determining include instructions to cause the processor to perform determining, as the unmapped second properties, unmapped second properties that are not mapped to any of the first properties and for which operational data exists on the network device.

* * * * *